United States Patent [19]
Van Engelen

[11] Patent Number: 5,179,305
[45] Date of Patent: Jan. 12, 1993

[54] LINEAR MOTOR WITHIN A POSITIONING DEVICE

[75] Inventor: Gerard Van Engelen, Eindhoven, Netherlands

[73] Assignee: U.S. Philips Corporation, New York, N.Y.

[21] Appl. No.: 594,177

[22] Filed: Oct. 4, 1990

[30] Foreign Application Priority Data

Oct. 5, 1989 [NL] Netherlands .................. 8902473

[51] Int. Cl.⁵ .............................................. H02K 41/03
[52] U.S. Cl. ........................................ 310/13; 318/135
[58] Field of Search ............... 310/12, 13; 318/135, 318/687

[56] References Cited

U.S. PATENT DOCUMENTS

| | | | |
|---|---|---|---|
| 3,456,136 | 7/1969 | Pierro | 318/135 |
| 3,787,716 | 1/1974 | La France | 318/135 |
| 4,485,339 | 12/1984 | Trost | 318/640 |
| 4,506,204 | 3/1985 | Galburt | 318/653 |
| 4,509,002 | 4/1985 | Hollis, Jr. | 318/687 |
| 4,555,650 | 11/1985 | Asakawa | 318/135 |
| 4,563,602 | 1/1986 | Nagasaka | 310/12 |
| 4,654,571 | 3/1987 | Hinds | 318/687 |
| 4,698,575 | 10/1987 | Bouwer | 318/640 |
| 4,870,306 | 9/1989 | Petersen | 310/12 |
| 4,908,533 | 3/1990 | Karitz et al. | 310/12 |

Primary Examiner—Steven L. Stephan
Assistant Examiner—D. R. Haszko

[57] ABSTRACT

A linear motor comprising first and second motor sections which are movable relative to one another along a motor axis. The first motor section includes a coil support carrying a coil system and the second motor section includes a magnet support carrying at least one pair of magnets which, at least when viewed along the motor axis, are spaced at a distance from one another to form a gap and which are arranged to cooperate with the system of coils across an air gap. The system of coils of the first motor section comprises a set of three coils arranged in line viewed along the motor axis, i.e. two peripheral coils and one central coil. The central coil has a coil length at least substantially equal to said distance between the pair of magnets of the second motor section. The central coil is disposed at least substantially completely opposite the gap between the magnets in a neutral position of the motor sections relative to each other.

8 Claims, 4 Drawing Sheets

LINEAR MOTOR WITHIN A POSITIONING DEVICE

BACKGROUND OF THE INVENTION

The invention relates to a linear motor comprising two motor sections which are movable relative to one another along a motor axis, a first motor section comprising a coil support carrying a system of coils whose turns are oriented transversely of the motor axis and a second motor section comprising a magnet support carrying at least one pair of magnets which, at least when viewed along the motor axis, are spaced at a distance from one another to form a gap and which are constructed to cooperate with the system of coils across an air gap.

The invention further relates to a positioning device comprising a frame, a positioning table and at least one linear motor.

Such a positioning device is known from U.S. Pat. No. 4,485,339. The prior-art device has a base plate carrying a first and a second coil, which are spaced from each other. The prior-art device further comprises a first magnet arranged in facing relationship with the first coil, a second magnet arranged in facing relationship with the second coil, and a linking member which magnetically links the two magnets and which has a supporting surface for an object to be positioned. The base plate, the magnets and the linking member together form a magnetic circuit and in conjunction with the coils they constitute a linear drive unit for the linking member.

The prior-art positioning device comprises a detection unit for detecting the position of the linking member and a control unit for controlling the magnitude and the direction of the electric current in the two coils in order to move the magnets and the linking member relative to the base plate along a linear path parallel to the aligned coil axes of the coils.

A drawback of the prior-art linear drive unit is that it can perform only a small travel in relation to the motor dimensions, in particular the dimension viewed along the coil axes, which requires a comparatively large and heavy construction of the positioning device for a predetermined travel. Another drawback of the prior-art linear motor is that in operation comparatively large energized parts of the coils do not effectively contribute to the generation of driving Lorentz forces, causing unnecessary power dissipation.

SUMMARY OF THE INVENTION

It is an object of the invention to provide a linear motor as defined in the opening paragraph, which combines a small length dimension with a comparatively large travel.

To this end the linear motor in accordance with the invention is characterized in that the system of coils of the first motor section comprises a set of three coils arranged in line viewed along the motor axis, i.e. two peripheral coils and one central coil, the central coil having a coil length at least substantially equal to said distance between the pair of magnets of the second motor section, the central coil being disposed at least substantially wholly opposite the gap between the magnets in the neutral position of the motor sections relative to each other.

When suitably energized the coils of the linear motor in accordance with the invention can very effectively produce a driving force, enabling a large travel of the motor sections relative to each other to be obtained. An advantage of this is that the motor dimensions, at least the dimension in the direction of the motor axis, can be small in relation to the desired travel in the same direction. An additional advantage is that unnecessary power dissipation is minimized, which contributes to a correct thermal balance of the motor.

An embodiment of the linear motor in accordance with the invention, comprising means for detecting the mutual position of the two motor sections and means for controlling the current direction in said turns of the system of coils in upon the mutual position of the two motor sections characterized in that said means are adapted in such a manner that in operation the current direction in the turns of one peripheral coil is opposed to the current direction in the turns of the other peripheral coil while the current direction in the turns of the central coil, which is out of its neutral position and which is consequently situated at least partly opposite one of the magnets, is the same as the current direction in the turns of the peripheral coil which faces the relevant magnet. The system comprising the linear motor in accordance with the invention and said means enables the available set of coils to be utilized to an optimum extent, so that a surprisingly large travel can be obtained in an efficient manner.

It is another object of the invention to provide a positioning device which is capable of moving an object over the same distance and with at least the same accuracy as is attainable with the prior-art device but which can be of smaller dimensions.

To this end the positioning device in accordance with the invention comprises a frame, a positioning table and at least a linear motor in accordance with the invention, the coil support of the linear motor being secured to the frame and the magnet support of the linear motor being secured to the positioning table, the frame being constructed as a flux guide. The magnet support may also form a part of the positioning table.

In the positioning device in accordance with the invention the positioning table can be of comparatively small dimensions owing to the favourable properties of the linear motor used in the device. This enables the mass and the mass inertia of the positioning table to be minimized, which is favourable both for the required driving power and for the bandwidth of the control system of the positioning device.

An embodiment of the positioning device in accordance with the invention is characterized in that the device comprises four linear motors in accordance with the invention arranged in pairs, the motor axes of the motors of one pair being oriented transversely of the motor axes of the motors of the other pair. This embodiment has the advantage that the arrangement comprising four linear motors can exert equal driving forces on the positioning table in the two coordinate directions (X, Y) of an orthogonal coordinate system along which said table is movable. Another special advantage is that to rotate the positioning table about an axis of rotation having a third coordinate direction (Z) the coils can be driven in dependence upon the instantaneous load of the coils, enabling the individual motors to be utilized most effectively.

A further embodiment of the positioning device in accordance with the invention, in which the two magnets of each of the motors are magnetized oppositely, is characterized in that the adjacent magnets of two motors which are disposed transversely of each other are magnetized in like directions. This magnet arrangement has the advantage that it minimizes overlapping of the magnetic circuits of the various motors, which precludes undesired interaction.

BRIEF DESCRIPTION OF THE DRAWINGS

Embodiments of the invention will now be described in more detail, by way of example, with reference to the drawings, in which.

DESCRIPTION OF THE PREFERRED EMBODIMENTS

Figure 1A:
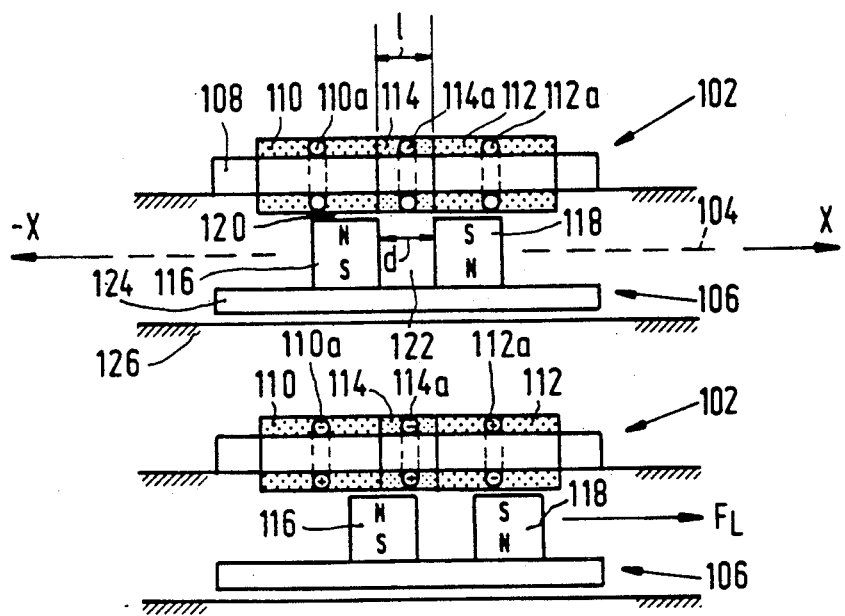
FIGS. 1A to 1F diagrammatically represent the linear motor in accordance with the invention in different situations.

The linear motor in accordance with the invention, which is shown diagrammatically in FIGS. 1A to 1F, comprises a stationary motor section 102 and a motor section 106 which is movable along a motor axis 104. The stationary motor section 102 comprises a soft-magnetic coil support 108 carrying two peripheral coils 110 and 112 and a central coil 114 interposed between the two peripheral coils. The coils 110, 112 and 114 comprise turns 110a, 112a and 114a respectively disposed in planes which are oriented at least substantially perpendicularly to the motor axis 104. Depending on their winding directions relative to each other the peripheral coils 110 and 112 may be electrically connected to each other in series or in series opposition.

The motor section 106 comprises two oppositely magnetized permanent magnets 116 and 118 each having a magnet pole, N and S respectively, facing the motor section 102 in order to cooperate with the coils 110, 112 and 114 across an air gap 120. The magnets are secured to a magnet support 124, which is constructed, for example, as a table or a slide and which is supported on a magnetically conductive base 126, for example by means of a static gas bearing.

The central coil 114 has a length 1 corresponding to the distance d between the magnets 116 and 118. In the situation illustrated in FIG. 1A, in which no electric current flows through the turns 110a, 112a and 114a, the motor section 102 occupies a neutral position in which the central coil 114 is situated exactly opposite the gap 122 between the magnets 116 and 118. From this position the motor section 106 can be moved relative to the motor section 102 in the X direction or in the −X direction.

Figure 1B:
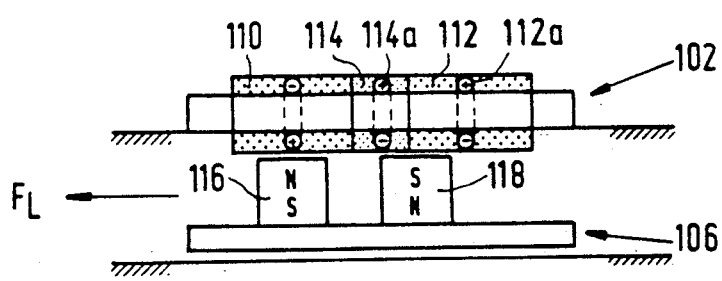

In the situation shown in FIG. 1B the motor section 106 is subjected to a driving force (Lorentz force) $F_1$ in the X direction and the motor section 106 has performed a specific movement relative to the neutral position in the X direction. The peripheral coils are then energized in such a way that the current direction in the turns 110a is opposed to that in the turns 112a. In this situation the central coil 114 is energized in such a manner that the current direction in the turns 114a is the same as that in the turns 110a, which inter alia enables a larger displacement in the X direction and hence a larger maximum travel to be obtained. In the Figures the directions of the currents in the turns 110a, 112a and 114a is symbolized by means of + and − signs. The electric currents through the three coils may be equal in absolute magnitude.

Figure 1C:
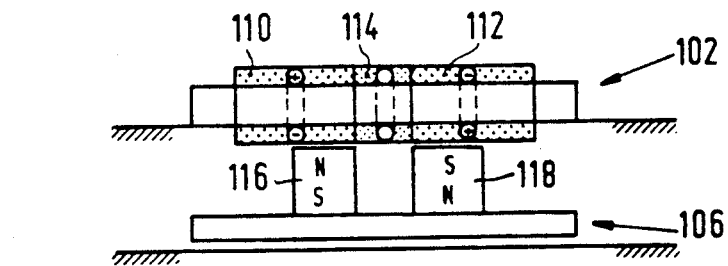
Figure 1D:
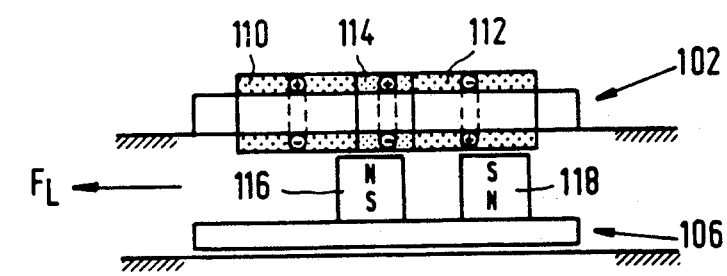
Figure 1E:
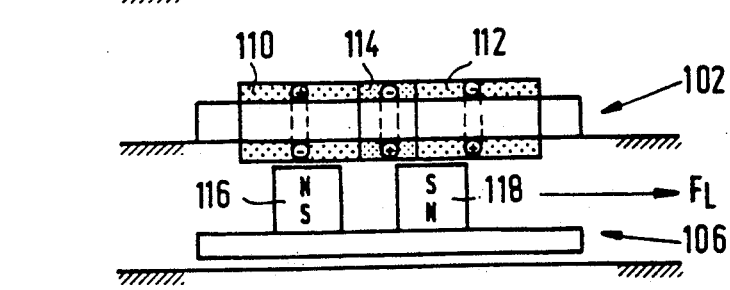

In order to generate a driving force $F_1$ in the −X direction starting from the position reached by means of the energization in accordance with FIG. 1B the current direction in the coils 110 and 114 and that in the peripheral coil 112 are reversed simultaneously by commutation, resulting in the current directions given in FIG. 1E. This energization enables the neutral position as shown in FIG. 1D to be obtained. When the neutral position is reached the central coil 114 may be de-energized.

If a driving force $F_1$ in the −X direction is required starting from the neutral position shown in FIG. 1D the peripheral coils 110 and 112 are energized simultaneously in a manner as indicated in FIG. 1C and once the motor section 106 has been set into motion the central coil is energized, the current direction in the turns 114a being the same as that in the turns 112a. In a practical embodiment the coils 110, 112 and 114 will be energized simultaneously in this situation.

Figure 1F:
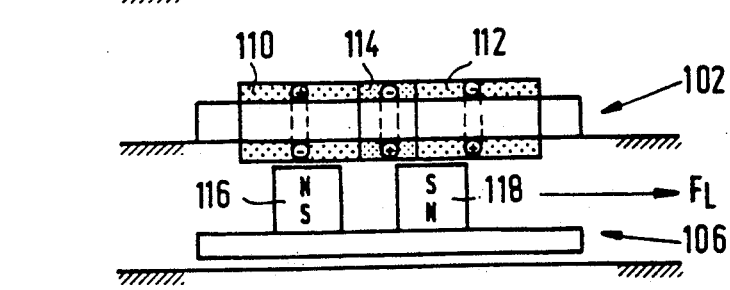

In order to move the motor section 106 in the X direction starting from a position reached with the energization in accordance with FIG. 1C the coils 110, 112 and 114 are energized simultaneously in a manner as illustrated in FIG. 1F.

Figure 2:
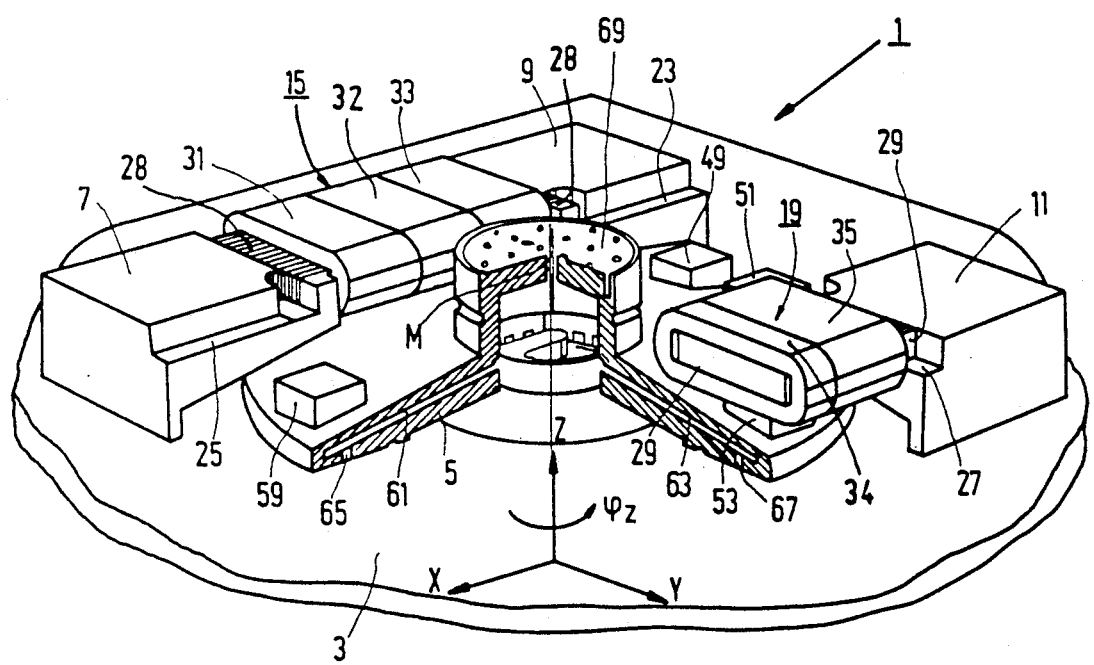
FIG. 2 is a perspective view of a part of the positioning device in accordance with the invention.
Figure 3:
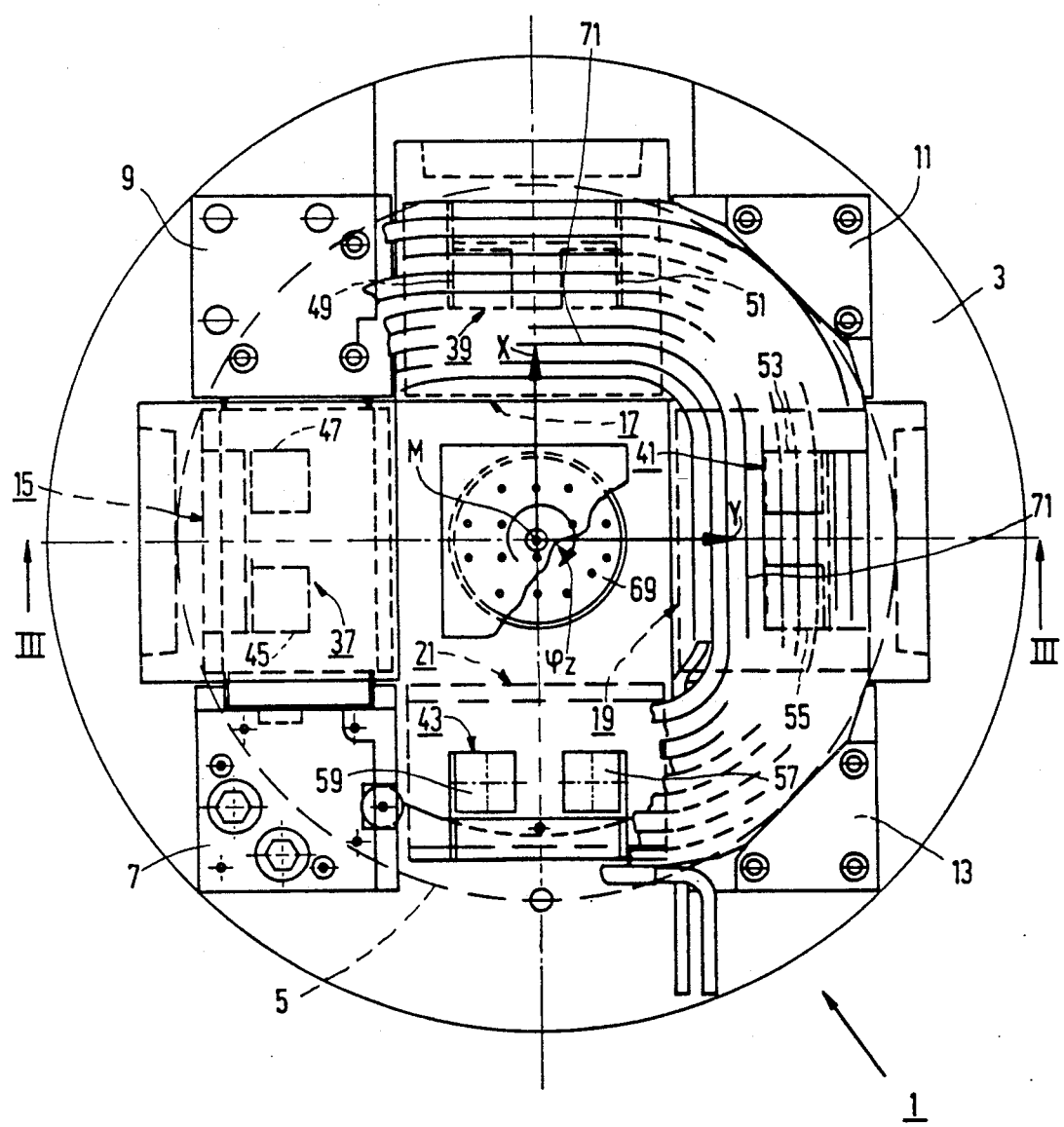
FIG. 3 is a plan view of the positioning device shown in FIG. 2.

The positioning device 1 in accordance with the invention shown in FIGS. 2 to 5 comprises a frame 2 having a horizontally disposed flat base 3 of a magnetically conductive material, for example an iron-cobalt alloy, over which a round skate 5 is guided. In operation the skate 5 is supported on the base 3 by means of an aerostatic bearing. As is apparent in particular from FIGS. 2 and 3 the base 3 carries four corner supports 7, 9, 11 and 13. The corner supports are formed with supporting surfaces for four coil systems 15, 17, 19 and 21, FIG. 2 showing the entire coil system 15 and half the coil system 19 and FIG. 3 showing the coil systems 15, 17, 19 and 21 in broken lines. The coil systems 15, 17, 19 and 21 are supported on said supporting surfaces via (laminated) coil formers or coil supports. Of these supporting surfaces only the supporting surfaces 23 and 25 of the coil systems 17 and 21 and the supporting surface 27 of the coil system 19 are visible in FIG. 2. Of the coil supports only two coil supports 28 and 29 of the coil systems 15 and 19 respectively are visible in FIG. 2. The coil support 28 bears on the supporting surfaces 23 and 25, while the coil support 29 of the coil system 19 bears on the supporting surface 27 and is just visible. Each of the coil systems 15, 17, 19 and 21 comprises two peripheral coils and one central coil, such as the coils 31, 32 and 33 of the coil system 15. FIG. 2 shows only one peripheral coil 35 and half a central coil 34 of the coil system 19. A magnet system secured to the skate 5 is situated underneath each coil system in facing relationship therewith and together with the relevant coil system it constitutes an electric linear motor in accordance with the invention for movements in X or Y directions in accordance with an orthogonal system of axes as shown in FIG. 2.

As is apparent from FIG. 3, magnet systems 37, 39, 41 and 43 are arranged opposite the coil systems 15, 17, 19 and 21 respectively in the air skate 5, which functions as a magnet support. Each of the magnet systems 37, 39, 41 and 43 comprises two permanent magnets which are magnetized oppositely in directions parallel to the Z axis of the coordinate system. The magnet systems 37, 39, 41 and 43 include the permanent-magnet pairs (45, 47), (49, 51), (53, 55) and (57, 59). The magnets are positioned in such a manner relative to each other that the pairs comprising the magnets (43, 45), (47, 49), (51,53) and (55, 57) exhibit opposite directions of magnetization. Of the permanent-magnet pairs (45, 47), (49, 51), (53, 55) and (57, 59) FIG. 2 shows the magnet 59 opposite the coil system 21, the magnets 49 and 51 opposite the coil system 17 and the magnet 53 opposite the coil system 19. The magnetic circuit of each of the linear motors described, whose operation is identical to that of the motor described with reference to FIGS. 1A to 1F, is formed by the iron-cobalt alloy between the magnets of a pair, the permanent magnets and the coil formers of the coil systems. The width of the air gap in the magnetic circuit between the coil systems and the permanent magnets is dictated entirely by the width of the air gap between the base 3 and the air skate 5 in the aerostatic bearing. Since the magnetic short-circuit between the permanent magnets of a magnet system is established via the base 3 the aerostatic bearing is magnetically biassed.

Figure 4:
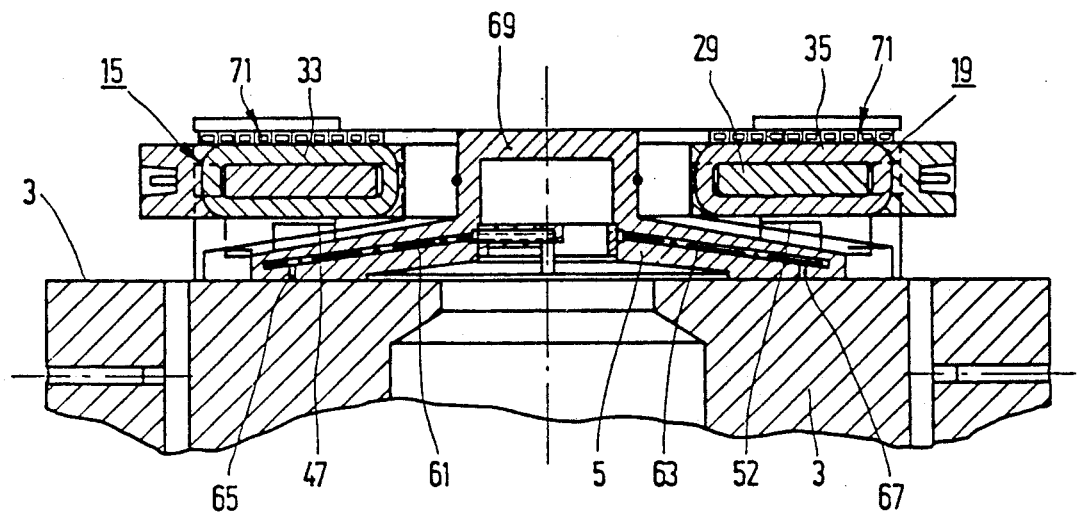
FIG. 4 is a sectional view taken on the line III—III in FIG. 3.
Figure 5:
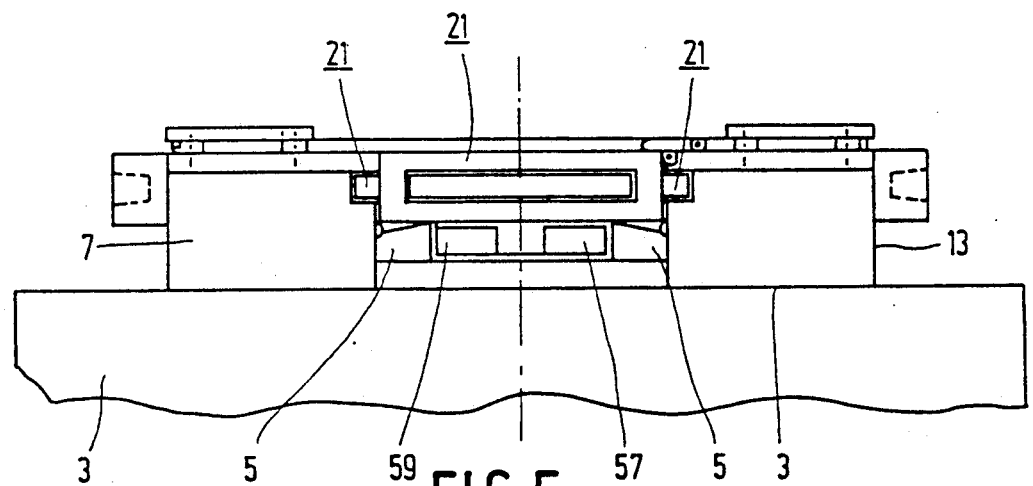
FIG. 5 is a side view of the positioning device shown in FIG. 2.

The air skate is formed with radial ducts required for said bearing. FIGS. 2 and 4 show a duct 61 and a duct 63. The air in the aerostatic bearing reaches the locations where a high-pressure area is to be built up via transverse ducts 65 and 67 which communicate with the ducts 61 and 63 and which open into the air gap between the skate 5 and the base 3. The bias of the aerostatic bearing also depends on the weight of the skate 5. The central portion of the skate 5 can produce an additional bias by means of a vacuum. The central portion of the skate, formed by a cylinder 69, should then be isolated from the peripheral portion of the skate where the bearing is situated. The cylinder 69 constitutes the table of the positioning device. Moreover, the ducts 61 and 63 are connected to a source of air by means of the cylinder 69.

At the sides which are remote from the magnet systems the coil systems 15, 17, 19 and 21 are in thermal contact with a cooler 71 common to all the coil systems.

Energizing the coil systems 15 and 19 of the linear electric motors with identical currents in a manner as described with reference to FIGS. 1A to 1F, in order to move the skate 5 parallel to the X axis, results in a pure translation. For the Y axis this can be achieved in a similar manner. In the neutral position of the table 69 shown in FIGS. 2 and 3, in which the movable section of each linear motor occupies its neutral position relative to the stationary non-movable section, a center M of the table is situated on the Z axis of the coordinate system. A rotation $\phi_z$ of the table 69 about the Z axis without translations of the center Z can be obtained either by oppositely energizing the two linear electric motors for the X direction with currents of equal magnitude or by energizing the linear motors for the Y direction in a manner similar thereto. It is also possible to energize all the linear motors in order to obtain a rotation $\phi_z$. Translations and rotations of the center M can also be performed simultaneously.

The positioning device in accordance with the invention described herein is very suitable for manufacturing masks for use in the fabrication of integrated circuits During fabrication these masks are subjected to one or more exposures in accordance with a very accurate pattern. Subsequently, the masks are employed in an optical lithographic arrangement for the exposure of semiconductor slices (wafers). Such an optical lithographic arrangement (wafer stepper) can also utilize the positioning device described in the foregoing. Obviously, other uses are also possible.

Figure 6:
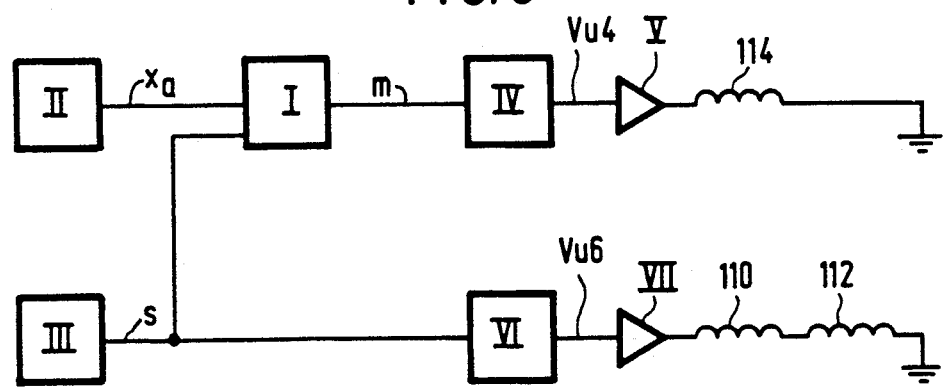
FIG. 6 is a block diagram of the control system of a linear motor in accordance with the invention.

The control system employed in the linear motor in accordance with the invention will be described with reference to FIG. 6. A signal $x_a$ from a detection unit II comprising one or more position transducers and a control signal s from a digital signal processor III are applied to a digital commutation module I. The signal $x_a$ provides information about the actual or instantaneous position of the moving motor section relative to its neutral position ($x=0$). From the module I, in which the signal s is commutated in dependence upon the signal $x_a$, a signal m is applied to a digital-to-analog converter IV, which supplies an output voltage $V_{u4}$ to a voltage-controlled current amplifier V to drive a central coil 114 (see also FIGS. 1A-1F). The control signal s from the processor III is also applied to a D/A converter VI, which supplies an output voltage $V_{u6}$. The D/A converter VI has its output electrically connected to the input of a voltage-controlled current amplifier VII to drive the peripheral coils 110 and 112 (see also FIGS. 1A-1F).

For completeness' sake it is to be noted that the invention is not limited to the embodiments shown herein. For example, in order to reduce the power dissipation in the motor, it is possible to replace each of the peripheral coils by a pair of separately energizable modified coils, one of the coils of the pair of modified coils, viewed along the motor axis, having the same length as the facing magnet and the other coil having a length corresponding to half the motor travel. The modified peripheral coils are energized selectively depending on their positions relative to the magnets.

I claim:
1. A linear motor comprising: first and second motor sections which are movable relative to one another along a direction parallel to a motor axis, a first motor section comprising a coil support carrying a system of three coils with their respective coil axes aligned parallel to said motor axis and whose turns are oriented perpendicularly of the motor axis, and a second motor section comprising a magnet support carrying at least one pair of magnets which, viewed along the motor axis, are spaced at a distance from one another to form a non-magnetizable gap and which have magnetic poles facing the first motor section to cooperate with the system of coils across an air gap, characterized in that the system of three coils of the first motor section comprises a set of two peripheral coils and one central coil, the central coil having a coil length substantially equal to said distance between the pair of magnets of the second motor section, the central coil being disposed substantially completely opposite the gap between the magnets in a neutral position of the motor sections relative to each other.

2. A linear motor as claimed in claim 1, further comprising means for detecting the mutual position of the two motor sections and means for controlling the current direction in said turns of the system of coils in dependence upon the mutual position of the two motor sections, characterized in that said means for controlling are adapted in such a manner that in operation the current direction in the turns of one peripheral coil is opposed to the current direction in the turns of the other peripheral coil while the current direction in the turns of the central coil, which is out of its neutral position and which is consequently situated at least partly opposite one of the magnet, is the same as the current direction in the turns of the peripheral coil which faces said one of the magnets.

3. A positioning device comprising a frame, a positioning table and at least one linear motor as claimed in claim 1 the coil support of the linear motor being secured to the frame and the magnet support of the linear motor being secured to the positioning table, the frame being constructed as a flux guide.

4. A positioning device comprising a frame, a positioning table and at least one linear motor as claimed in claim 2, the coil support of the linear motor being secured to the frame and the magnet support of the linear motor being secured to the positioning table, the frame being constructed as a flux guide.

5. A positioning device comprising a frame, a positioning table and four linear motors such as claimed in claim 1, the coil support of the linear motors being secured to the frame and the magnet support of the linear motors being secured to the positioning table, the frame being constructed as a flux guide, said four motors being arranged in pairs, the motor axes of the motors of one pair being oriented transversely of the motor axes of the motors of the other pair.

6. A positioning device comprising a frame, a positioning table and four linear motors such as claimed in claim 2, the coil support of the linear motors being secured to the frame and the magnet support of the linear motors being secured to the positioning table, the frame being constructed as a flux guide, said four motors being arranged in pairs, the motor axes of the motors of one pair being oriented transversely of the motor axes of the motors of the other pair.

7. A positioning device as claimed in claim 5, in which the two magnets on each of the motors are magnetized oppositely, characterized in that the adjacent magnets of two motors which are disposed transversely of each other are magnetized in like directions.

8. A positioning device as claimed in claim 6, in which the two magnets on each of the motors are magnetized oppositely, characterized in that the adjacent magnets of two motors which are disposed transversely of each other are magnetized in like directions.

* * * * *